(12) United States Patent
Zhang et al.

(10) Patent No.: US 8,750,127 B2
(45) Date of Patent: Jun. 10, 2014

(54) SYSTEMS AND METHODS FOR MULTI-DOMAIN ROUTING

(75) Inventors: Qiong Zhang, Plano, TX (US); Mohammad Masud Hasan, Richardson, TX (US); Xi Wang, Murphy, TX (US); Paparao Palacharla, Richardson, TX (US); Takao Naito, Plano, TX (US); Fredrick S. Gruman, Plano, TX (US)

(73) Assignee: Fujitsu Limited, Kawasaki-shi (JP)

(*) Notice: Subject to any disclaimer, the term of this patent is extended or adjusted under 35 U.S.C. 154(b) by 1106 days.

(21) Appl. No.: 12/751,656

(22) Filed: Mar. 31, 2010

(65) Prior Publication Data
US 2011/0242995 A1 Oct. 6, 2011

(51) Int. Cl.
*H04L 1/00* (2006.01)
*H04L 12/26* (2006.01)
*H04L 12/56* (2006.01)

(52) U.S. Cl.
CPC .............. *H04L 45/12* (2013.01); *H04L 45/126* (2013.01); *H04L 45/02* (2013.01); *H04L 45/128* (2013.01); *H04L 45/22* (2013.01); *H04L 45/00* (2013.01)
USPC .......................................................... 370/238

(58) Field of Classification Search
CPC ......... H04L 45/12; H04L 45/126; H04L 5/02; H04L 45/128; H04L 45/00; H04L 45/22
USPC ......... 370/216, 217, 221, 226, 238, 241, 242, 370/248, 252, 254, 255, 352, 392, 395.41, 370/395.5, 395.52, 401; 709/241
See application file for complete search history.

(56) References Cited

U.S. PATENT DOCUMENTS

| | | | |
|---|---|---|---|
| 7,031,262 B2* | 4/2006 | Vasseur et al. | 370/248 |
| 7,209,975 B1* | 4/2007 | Zang et al. | 709/238 |
| 7,512,063 B2* | 3/2009 | Vasseur et al. | 370/217 |
| 7,515,529 B2* | 4/2009 | Vasseur et al. | 370/221 |
| 8,351,418 B2* | 1/2013 | Zhao et al. | 370/351 |
| 2006/0153067 A1* | 7/2006 | Vasseur et al. | 370/217 |

OTHER PUBLICATIONS

Zhang et al., "Efficient PCE-Based Survivable path Computation in Multi-Domain Networks", Mar. 10, 2011, IEEE, all pages.*
A. Farrel; "A Path Computation Element (PCE)-Based Architecture"; www.ietf.org; pp. 35, Dec. 17, 2008.
I. Nishioka et al.; "The use of SVEC (Synchronization VECtor) list for Synchronized dependent path computations"; http://tools.ietf.org/id/draft-ietf-pce-pcep-svec-list-01.txt; pp. 12, Aug. 3, 2009.

(Continued)

*Primary Examiner* — Kwang B Yao
*Assistant Examiner* — Adam Duda
(74) *Attorney, Agent, or Firm* — Baker Botts L.L.P.

(57) ABSTRACT

Systems and methods for multi-domain routing are provided. In some embodiments, a method for determining a path calculation from a source node to a destination node over a multi-domain network is provided. The method may include steps for receiving a predetermined sequence of domains for communicating information from the source node to the destination node, determining a link type for each of a plurality of links in the predetermined sequence of domains, modifying the link type of one or more of the plurality of links such that the plurality of links are unidirectional links towards a destination node, and determining a path along the predetermined sequence of domains based on the modified plurality of links.

16 Claims, 5 Drawing Sheets

(56) References Cited

OTHER PUBLICATIONS

Survivable Networks: Algorithms for Diverse Routing; "The simple two-step-approach algorithms and their shortcomings"; pp. 3.

Vasseur et al.; "A Backward-Recursive PCE-Based Computation (BRPC) Procedure to Compute Shortest Constrained Inter-Domain Traffic Engineering Label Switched Paths"; http://tools.ietf.org/html/rfc5441; pp. 19, Jul. 28, 2009.

Elementary Graph Algorithms; "Dijkstra's Algorithm"; pp. 3.

* cited by examiner

SYSTEMS AND METHODS FOR MULTI-DOMAIN ROUTING

TECHNICAL FIELD

The present disclosure relates to networks, and in particular, systems and methods for multi-domain routing.

BACKGROUND

The continual growth of networks has caused the control and management of different network elements to become difficult. For example, issues such routing may arise due to the limited size of routing database. Other issues such as limited processing capabilities and different ISP administration have caused concern. In order to reduce these issues, networks are often divided into domains, e.g., a collection of network elements that have a common administration and/or share a common routing strategy. However, in order to calculate paths between the domains, large amounts of network information are exchanged between the domains and issues such as data confidentiality, scalability, latency, and throughput are still prevalent.

SUMMARY

In accordance with the teachings of the present disclosure, the disadvantages and problems associated with current network path identification have been reduced or eliminated. In some embodiments, a method for determining a path calculation from a source node to a destination node over a multi-domain network is provided. The method may include steps for receiving a predetermined sequence of domains for communicating information from the source node to the destination node, determining a link type for each of a plurality of links in the predetermined sequence of domains, modifying the link type of one or more of the plurality of links such that the plurality of links are unidirectional links towards a destination node, and determining a path along the predetermined sequence based on the modified plurality of links.

In other embodiments, a network system is provided. The network system may include a source domain comprising a source node, a destination domain communicatively coupled to the source domain, where the destination domain includes a destination node, a first path computation element associated with the source domain, and a second path computation element associated with the destination domain. Each of the first and second computation element may be configured to receive a predetermined sequence of domains for communicating information from the source node to the destination node, determine a link type for each of a plurality of links in the respective domain, modify the link type of one or more of the plurality of links such that the plurality of links are unidirectional links towards a destination node, and determine a path along the predetermined sequence of domains based on the modified plurality of links.

In certain embodiments, a method for determining a path calculation from a source node to a destination node over a multi-domain network is provided. The method may include modifying, in network topology information, a bidirectional link to a unidirectional link from a source node to a destination node, removing, in network topology information, unidirectional links from the destination node to the source node, and determining a least costly path based on the network topology information with the modified and removed links between a source node and the destination node.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

Figure 1:
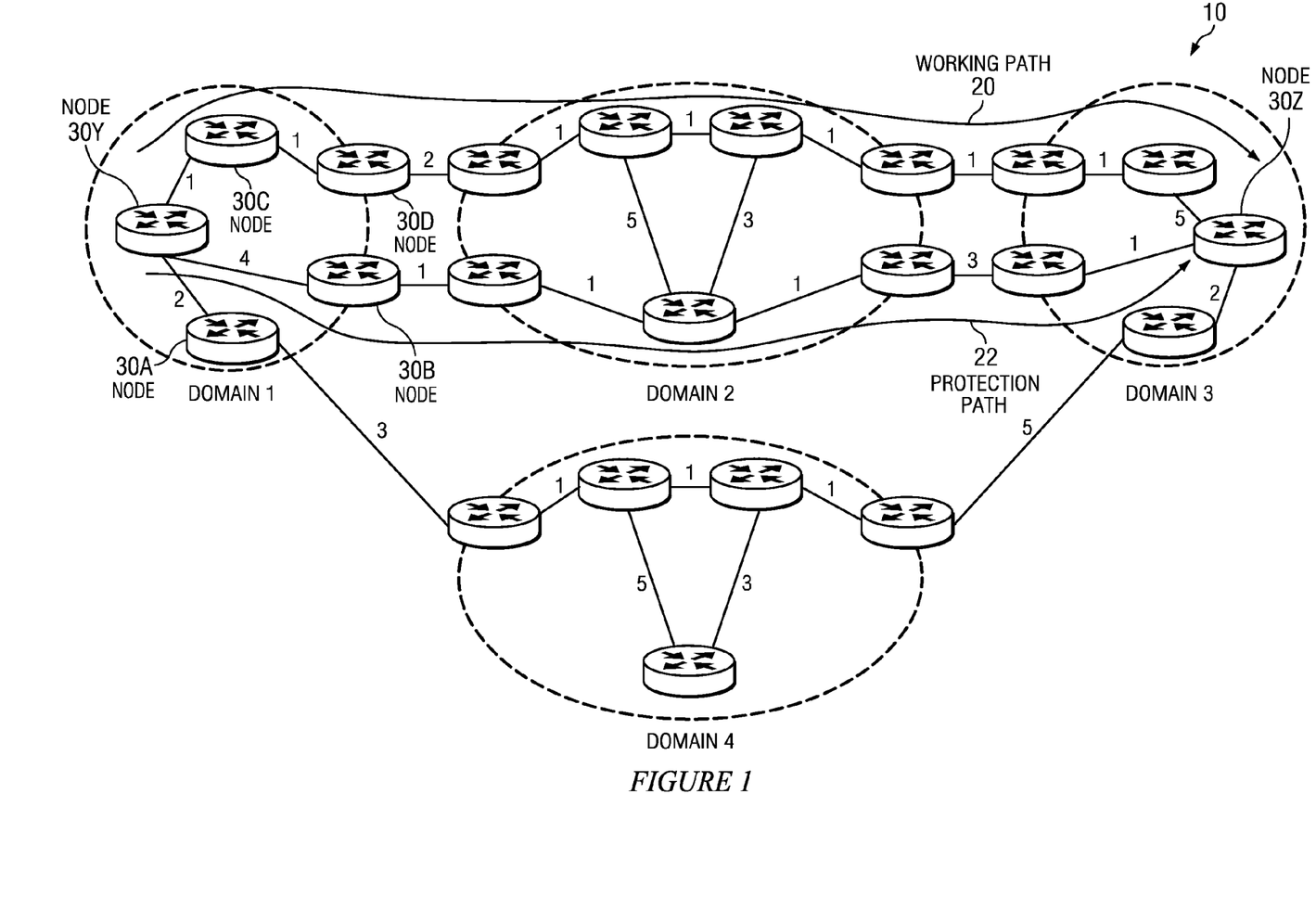
FIG. 1 illustrates an example of a multiple-domain network, in accordance with certain embodiments of the present disclosure.

FIG. 1 illustrates an example of a multiple-domain network 10, in accordance with certain embodiments of the present disclosure. Network 10 may be divided into multiple domains, each domain including a collection of network elements that have a common administration and/or share a common routing strategy. For example, as depicted in FIG. 1, network 10 includes four domains, labeled domain 1 through 4. Each domain may include multiple nodes 30 configured to send, receive, and/or forward information. As an example, domain 1 of network 10 includes nodes 30A through 30D and a source node 30Y, although it is noted that a domain may include any number of nodes 30.

In order to determine a path between a source node 30Y of a first domain and a destination node 30Z of a second domain, a sequence of domains where the path traverses may be determined. In some embodiments, the sequence of domains may be predetermined by network operators or discovered by inter-domain routing schemes. For example, referring to FIG. 1, the sequence of domains between source node 30Y of domain 1 and destination node 30Z of domain 3 may traverse from domain 1, through domain 2, to domain 3. An alternative sequence of domains may include domain 1, domain 4, and domain 3.

Once the sequence of domains is determined, one or more paths between source node 30Y and destination node 30Z may be established. In some embodiments, a working path 20 is determined, where working path 20 may be the least costly or shortest source-to-destination path over the sequence of domains. In the same or alternative embodiments, a protection path 22 may be determined. Protection path 22 may be a path that is mutually exclusive from working path 20 and may be used in the event working path 20 is unavailable. Techniques for determining the path between a source node to a destination node is described in more detail with respect to FIG. 2.

Figure 2:
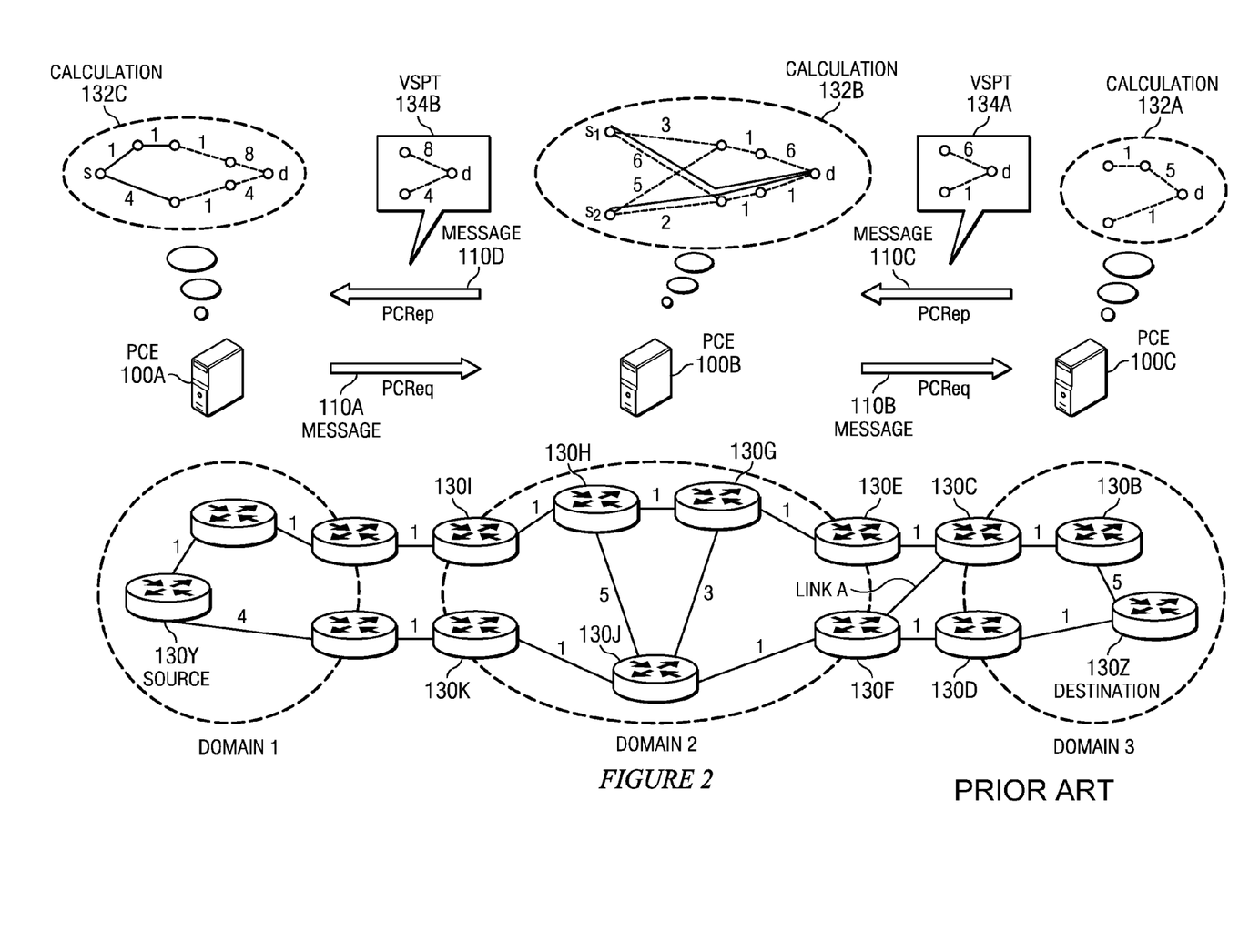
FIG. 2 illustrates an example technique for calculating a path over a predetermined sequence of domains.

FIG. 2 illustrates an example for calculating a path over a predetermined sequence of domains, e.g., domains 1, 2 and 3. Each domain may have an associated path computation element (PCE) 100 that is configured to exchange information with other PCEs as well as determine multi-domain paths. As shown in FIG. 2, PCE 100A is associated with domain 1, PCE 100B is associated with domain 2, and PCE 100C is associated with domain 3. In some embodiments, PCE 100 may be a network node, a network management station, and/or a dedicated platform or processor that performs path computation.

The path calculation shown in FIG. 2 is known as backward recursive PCE-based computation (BRPC) as proposed in RFC5441 by the IETF PCE working group, where paths are determined in a backward direction, e.g., from the destination node to the source node. In some embodiments, PCE 100A associated with domain 1 comprising source node 130Y may first send a request to PCE 100C to determine one or more paths between destination node 130Z and source node 130Y. PCE 100A may send via message 110A a PCReq to PCE 100B which forwards the request to PCE 100C via message 110B. When PCE 100C receives the request (PCReq), PCE 100C may determine one or more paths.

In order to determine a path (e.g., work path 20 or protection path 22) between source node 130Y and destination node 130Z, each PCE 100 may calculate one or more paths between nodes 130 in the respective domain and may pass the calculated information along to the next PCE 100. For example, PCE 100C associated with domain 3, which includes destination node 130Z, may first determine different path options within domain 3 and may pass the path information to PCE 100B. In some respects, PCE 100C may determine a first path (between destination node 130Z, node 130B, and node 130C) and a second path (between destination node 130Z and node 130D). For each path, and in particular between each node in a domain, there is a cost or weight factor, which takes into account bandwidth, communication costs, delay, hop count, load, and/or reliability considerations. For example, between destination node 130Z and node 130B, and between node 130B and node 130C, the cost is five and one respectively, making the total cost for the first path six, as shown in calculation 132A. Similarly, for the second path between destination node 130Z and node 130D, the total cost is one. Once the path options have been determined, a virtual shortest path tree (VSPT) 134A which represents the different path options determined by PCE 100C may be forwarded to PCE 100B via message (PCRep) 110C.

When PCE 100B receives message 110C, PCE 100B may also calculate intra-domain paths options 132B within domain 2. For example, PCE 100B may determine a cost factor for a first path between nodes 130E, 130G, 130H, and 130I and a second path between nodes 130F, 130J, 130G, 130H, and 130I. PCE 100B also determines the costs for the paths that connect any terminal node(s) 130 between domain 3 and domain 2, e.g., cost between nodes 130C and 130E and cost between nodes 130D and 130F. Next, PCE 100B may determine the total path of the two paths in domain 2 by adding the associated path costs received from PCE 100C, represented by VSPT 134A and the intra-domain paths calculated for domain 2, as shown in path calculation 132B. PCE 100B may subsequently pass VSPT 134B which may represent the various path options of domain 2 and 3 to PCE 100A via message 110D.

Similarly, when PCE 100A receives message 110D, PCE 100A may determine path options within domain 1, as shown in path calculation 132C, taking into account VSPT 134B as well as paths that any connect terminal node(s) 130 between domain 1 and domain 2. Once PCE 100A determines the path options that communicatively link destination node 130Z to source node 130Y, PCE 100A may subsequently select a path (e.g., a working path and/or a protection path) based on the path options provided by PCE 100B.

The BRPC shown in FIG. 2 may have some disadvantages. For example, BRPC may not follow a predetermined path sequence. Referring to FIG. 2, if crossover link A exists between nodes 130F of domain 2 and node 130C of domain 3, a possible path option may include destination node 130Z, 130D, 130F, 130C, 130E, 130G, 130H, and 130I, e.g., the path traversing from domain 3 to domain 2 back to domain 3. If the predetermined sequence of domain is through domains 2 and 3, the crossover link A from domain 2 to domain 3 may allow a deviation from the sequence from domain of domain 3 to domain 2.

In some embodiments of the present disclosure, a forward path calculation, e.g., from the source node to the destination node may be used to determine a source-to-destination path. The forward path calculation of the present disclosure ensures that a predetermined sequence of domain is followed. Details of a forward path calculation are described with respect to FIG. 3 below.

Figure 3:
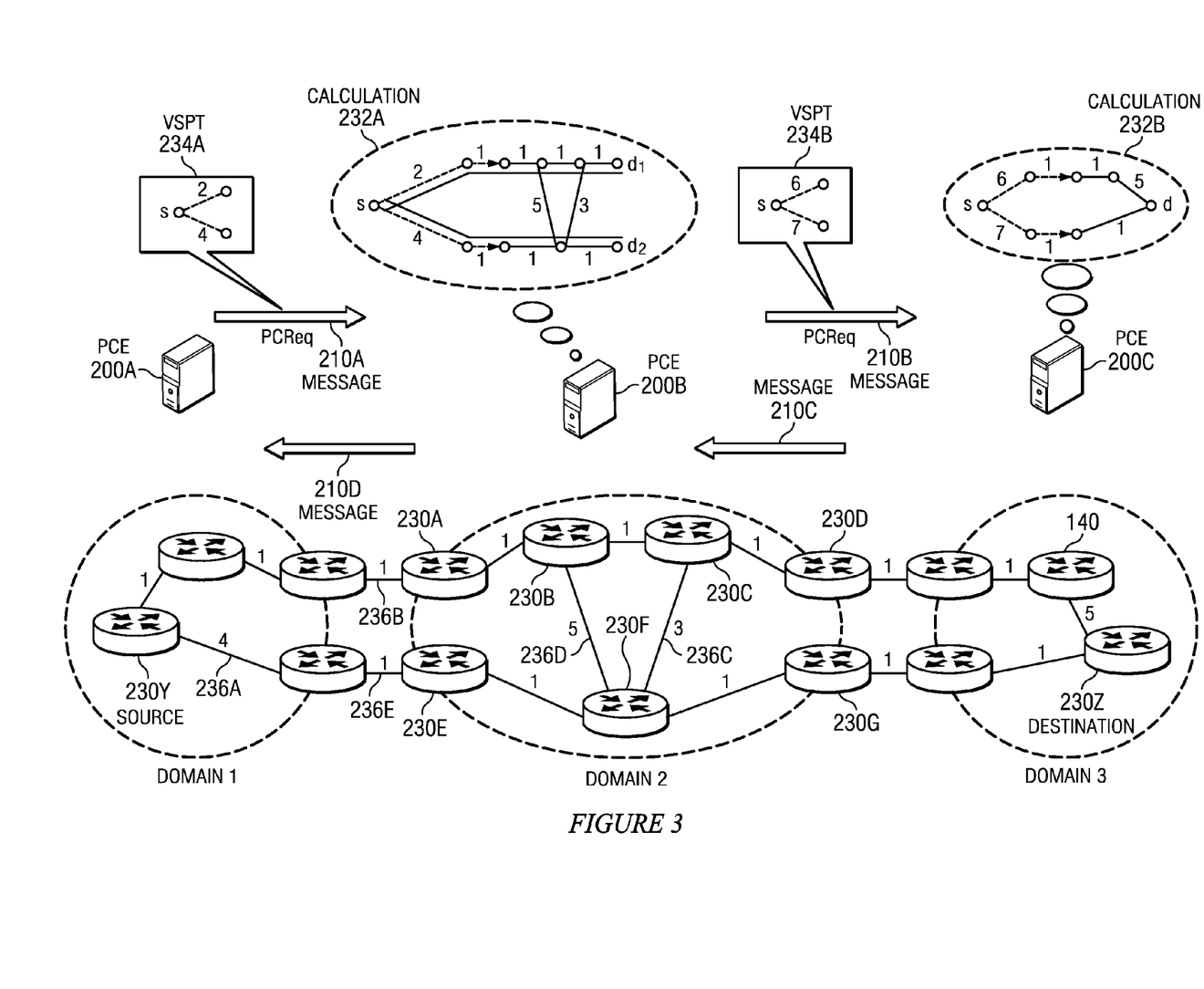
FIG. 3 illustrates an example technique for determining a forward path over a predetermined sequence of domains, in accordance with certain embodiments of the present disclosure.

FIG. 3 illustrates an example technique for determining a forward path over a predetermined sequence of domains, e.g., domains 1, 2 and 3, in accordance with certain embodiments of the present disclosure. Similar to the network shown in FIG. 2, each domain may have an associated path computation element (PCE) 200 that is configured to exchange information with other PCEs as well as determine multi-domain paths. As shown in FIG. 3, PCE 200A is associated with domain 1, PCE 200B is associated with domain 2, and PCE 200C is associated with domain 3.

In order to determining a forward path, links 236 that communicatively couple nodes within a domain and/or links 236 communicatively coupling nodes between domains (e.g., links between an ingress node of a first domain and an egress node of a second domain) may be evaluated and may be modified and/or removed from the network topology used for the path computation. In some embodiments, links 236 may include unidirectional links (links sending and receiving data in one direction, towards either source node 230Y or destination node 230Z). For example, link 236A may be a unidirectional link towards destination node 230Z, allowing data to be sent or received in that one direction. Similarly, if link 236B is a unidirectional link towards source node 230Y data may be sent or received in that one direction. In some embodiments, links 236 may include bidirectional links that may be configured to send or receive data in any direction, e.g., from source node to destination node and from destination node to source node.

To allow a forward path computation from the source to the destination node, one or more of links 236 may be modified in the PCE topology information. For example, in some embodiments, bidirectional links are modified such that the PCE considers them to be unidirectional links towards the destination node. In the same or alternative embodiments, any unidirectional links towards the source are removed from the topology such that the PCE does not consider them in the calculation. Any unidirectional link towards the destination node are not modified and may be used by the PCE to determine one or more forward path calculation.

Once links 236 have been modified and/or removed from the PCE topology information, a forward path computation may be determined. In some embodiments, PCEs 200 may determine the paths using Dijkstra's algorithm and/or any other shortest path algorithm available. Referring to FIG. 3, PCE 200A may construct VSPT 234A that represents the path options for domain 1 and may forward the information via message 210A to PCE 200B. Using the information received, namely VSPT 234A, PCE 200B may construct VSPT 234B. Referring to calculation 232A of FIG. 3, PCE 200B may calculate the multiple paths for domain 2. In some embodiments, links 236B and 236E may have been modified to a unidirectional link towards the destination, allowing the forward path calculation over the predetermined sequence of domain. While the example here shows the inter-domain links (e.g., links 236B and 236E between domain 1 and 2) are modified, it is noted that intra-domain links may also be modified to unidirectional links toward the destination as well. In some embodiments, PCE 200B may determine a first path across nodes 230A, 230B, 230C to 230D with a cost factor of 3. PCE 200B may also determine a second path across nodes 230A, 230B, 230F to 230G with a cost factor of 7. PCE 200B may determine a third path across node 230E, 230F, 230C, to 230D with a cost factor of 5. Based on the calculations, PCE 200B may determine the two paths that are the least costly, and may forward VSPT 234B which represent the calculations via message 210B to PCE 200C. PCE 200C may use the information received to construct and/or calculate a virtual topology for domain 3 by determining the cost factors of one or more available path options in domain 3. Once PCE 200C determines the path options that communicatively link source node 230Y and destination node 230Z, PCE 200C may send message 210C to PCE 200B. PCE 200B may subsequently forward the path options to PCE 200A via message 210D, where PCE 200A may subsequently select a path (e.g., a working path) based on the path options provided by PCE 200C.

In some embodiments, PCE 200C may determine the path, and may forward the selected path to any intermediate domain. For example, PCE 200C may select a working path, may forward via, for example, message 210C the selected path, where PCE 200B may perform calculations based on the selected path. PCE 200B may subsequently forward the selected path to PCE 200A, which may complete the selected path between source node 230Y and destination node 230Z.

It is noted that while PCE 200B may determine two paths in the example shown in FIG. 3, any number of paths may be determined based on, for example, the network configuration including the number of ingress nodes of a domain. Therefore, the number of available paths may vary.

Figure 4:
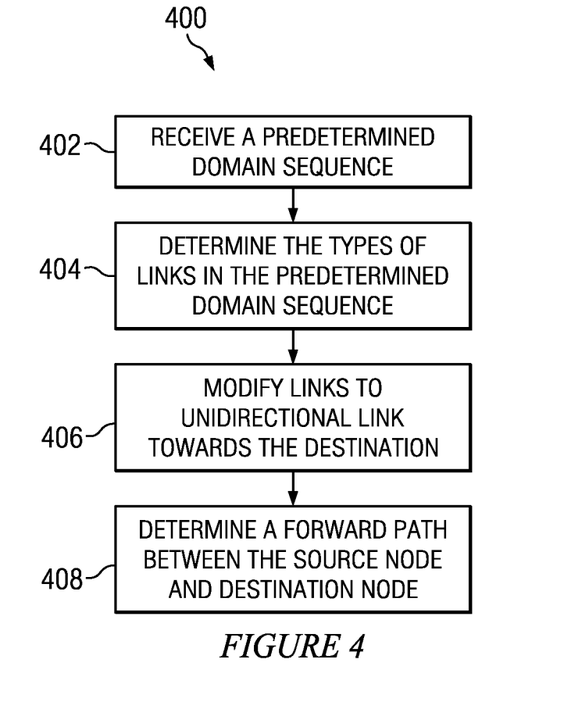
FIG. 4 illustrates an example method for implementing a forward path computation, in accordance with certain embodiments of the present disclosure.

FIG. 4 illustrates an example method 400 for implementing a forward path computation, in accordance with certain embodiments of the present disclosure. At step 402, PCEs of a number of domains may receive a predetermined sequence of domains from, for example, network operators and/or inter-domain routing schemes for routing data from a source node to a destination node. Based on the predetermined sequence of domains, the links that connect a source node and a destination node on the predetermined sequence of domains may be evaluated. At step 404, method 400 may determine the types of links. At step 406, if PCEs 200 determine that there are bidirectional links or unidirectional links towards the source node, the links may be modified to unidirectional links towards the destination.

In some embodiments, any bidirectional links that exist across the predetermined sequence of domains may be modified to unidirectional links towards destination node (e.g., 230Z of FIG. 3). Additionally, any unidirectional links towards source node (e.g., 230Y of FIG. 3) that exist across the predetermined sequence of domains may be removed from the topology information.

At step 408, any existing unidirectional links towards destination node 230Z and any modified bidirectional links may be used to determine a forward path calculation between source node 230Y and destination node 230Z. In some embodiments, PCEs 200 may determine all paths available for the predetermined sequence of domains, construct VSPT 234s, which represent the one or more path options as discussed above, and determine a path for communicatively coupling source node 230Y and destination node 230Z. In some embodiments, the selected path is the path with the least cost (e.g., the shortest path). In some embodiments, the protection path is selected. Details of determining a protection path is described below with respect to FIGS. 5 and 6.

Figure 5:
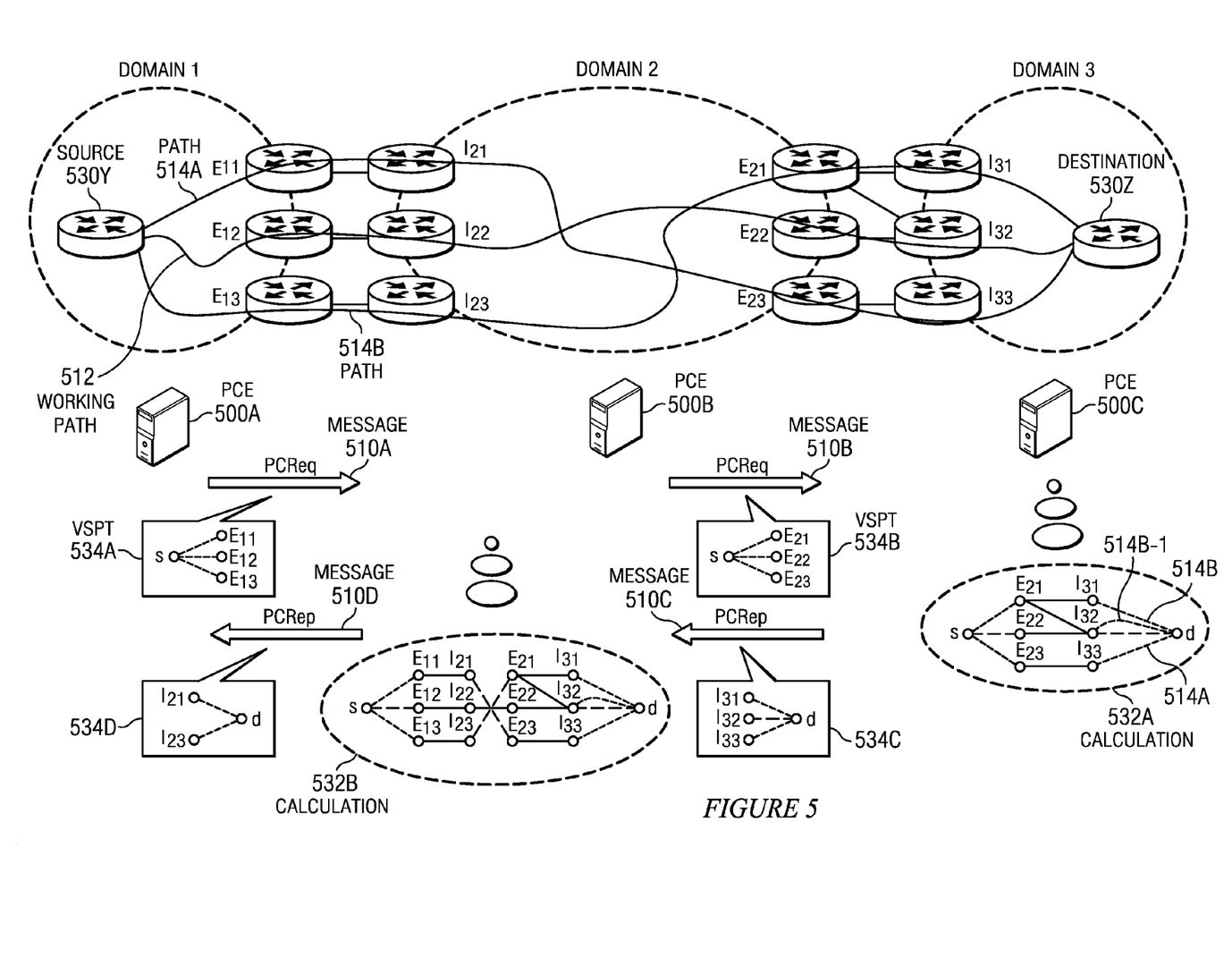
FIG. 5 illustrates an example technique for determining a multi-domain protection path, in accordance with embodiments of the present disclosure.

Referring to FIG. 5, an example technique for determining a multi-domain protection path is shown, in accordance with embodiments of the present disclosure. A protection path is a path that may be used when there is a failure in a primary path. In some embodiments, a protection path is disjoint from or is mutually exclusive of the primary path, such as with working path 20 and protection path 22 of FIG. 1.

Currently, in order to determine a protection path, a disjoint algorithm may be used. However, without knowing a first primary path, the disjoint algorithm may determine a path for each combination of ingress and egress nodes in the network. This type of computation may be complex and time consuming. The present disclosure provides a simple technique that first determines a first path between a source node and a destination node (e.g., path with least cost factors) and then determines a protection path that is disjoint from the first path. In some embodiments, determining a first path between a source node and a destination node may be done using the techniques shown in FIG. 3 and determining a protection path disjoint from the first path may include a backward path calculation (as shown in FIG. 2). Referring to FIG. 5, PCEs 500A through 500C are associated with domains 1 through 3 respectively. First, PCEs 500 may determine a least costly path 512 from a source node 530Y to a destination node 530Z using a forward path calculation as described, for example, in FIG. 4. In particular, after any link modifications, and a predetermined sequence of domain is received, PCE 500A may construct a VSPT 534A that represents the path options for domain 1 and may forward the information to PCE 500B via message 510A. PCE 500B, using the information forwarded from PCE 500A, may construct a VSPT 534B for domain 2 and may forward the information to PCE 500C via message 510B. PCE 500C, using at least the information provided in message 510B, may determine a virtual topology 532A for domain 3, and determine which path is working path 512.

Next, using, for example, a backward path computation, PCE 500C may determine potential protection paths in domain 3 that are part of path that is disjoint from working path 512. In some embodiments, PCE 500C may determine which nodes are disjoint from working path 512. For example, PCE 500C may determine which ingress node communicatively coupled to destination node 530Z is not used by working path 512. Referring to FIG. 5, working path 512 is across egress node $E_{12}$, ingress node $I_{22}$, egress node $E_{22}$, and ingress node $I_{32}$. Thus, ingress nodes $I_{31}$ and $I_{33}$ of domain 3 are part of a path this disjoint from working path 512, as shown in path options/calculations 532A. In particular, paths 514A and 514B traverse through ingress nodes $I_{31}$ and $I_{33}$ are available and are disjoint from working path 512. PCE 500C may construct VSPT 534C that represents the path options 532A, and may forward the information to PCE 500B via message 510C.

PCE 500B may determine one or more paths that are disjoint from working path 512 in domain 2. In some embodiments, using the information provided by PCE 500C, namely the number of ingress nodes that are disjoint from working path 512. Next, PCE 500B may implement a disjoint routing algorithm such as Suurballe's algorithm known in the art. Alternatively, PCE 500B may implement a two-step algorithm. In a first step, PCE 500B may remove the links that make up working path 512. PCE 500B may then determine if a protection path is available through domain 2. For example, PCE 500B may try to construct a path for each available ingress node $I_{21}$ and $I_{23}$. Referring to FIG. 5, PCE 500B may determine the one or more paths that are disjoint from working path 512 using at least the VSPT 534C provided from PCE 500C and the determined available ingress node $I_{21}$ and $I_{23}$. As shown, PCE 500B may determine that protection path 514A is available path through egress node $E_{23}$ to ingress node $I_{33}$ and through egress node $E_{11}$ to ingress node $I_{21}$. Similarly, protection path 514B is available through egress node $E_{21}$ to ingress node $I_{31}$ and egress node $E_{13}$ to ingress node $I_{23}$.

In some embodiments, in the event where a protection path may not be found, PCEs 500 may reroute or determine another working path 512, using for example, k-shortest path algorithm and subsequently determine a protection path. If the protection path cannot be determined, the request fails.

In instances where a protection path through domain 2 is determined, PCE 500B may construct a VSPT 534D, and may forward the information to PCE 500A via message 510D. PCE 500A may determine any available protection paths based on the information received. In some embodiments, PCE 500A may determine which egress nodes are disjoint from the egress node used by working path 512. For example, referring to FIG. 5, egress nodes $E_{11}$ and $E_{13}$ of domain 1 are available. Thus, two protection path 514A and 514B, which are disjoint from working path 512, are available to send and/or receive information in the event working path 512 fails.

In some embodiments, similar to the techniques described above in which the PCEs 500 determines one or more protection paths that are disjoint from working path 512 by determining which nodes are disjoint from path 512, PCEs 500 may determine one or more protection path by determining which links are disjoint from working path 512. For example, any links along working path 512 may be removed from the network topology and may not be used to determine protection path(s) 514. Referring to FIG. 5, working path 512 traverses from source node 530Y to destination node 530Z on a plurality of links including the link that directly couples ingress node $I_{32}$ and destination node 530Z. These links may be removed from the network topology by PCEs 500 such that the determination of a protection path is disjoint from those links. Next, PCE 500C may determine any links that are disjoint from the links used for working path 512. PCE 500C may determine the link between ingress node $I_{31}$ and $I_{33}$ and destination node 530Z, on paths 514A and 514B respectively, may be disjoint from links on working path 512. PCE 500C, implementing a two-step link disjoint algorithm and/or Suurballe's link-disjoint algorithm, may also determine any links that are disjoint from links on working path 512 that may traverse through ingress node $I_{32}$. As shown, the link on path 514B-1, which may traverse through ingress node $I_{32}$ to destination node 530Z may be available, as path 514B-1, may traverse through other nodes of domain 3, which do not overlap with path 512.

The possible protections paths (e.g., paths 514A and 514B) may be sent via message 510C to PCE 500B that may determine that protection path 514A is available path through egress node $E_{23}$ to ingress node $I_{33}$ and through egress node $E_{11}$ to ingress node $I_{21}$. Similarly, protection path 514B is available through egress node $E_{21}$ to ingress node $I_{31}$ and egress node $E_{13}$ to ingress node $I_{23}$. Protection path 514B may also be available through node $E_{21}$ to ingress node $I_{32}$ and egress node $E_{13}$ to ingress node $I_{23}$. PCE 500B may subsequently construct a VSPT 534D and may forward the information to PCE 500A via message 510D. PCE 500A may determine any available protection paths based on the information received. In some embodiments, PCE 500A may determine which egress nodes are disjoint from the egress node used by working path 512. For example, referring to FIG. 5, egress nodes $E_{11}$ and $E_{13}$ of domain 1 are available. Thus, two protection path 514A and 514B, which are disjoint from working path 512, are available to send and/or receive information in the event working path 512 fails.

Figure 6:
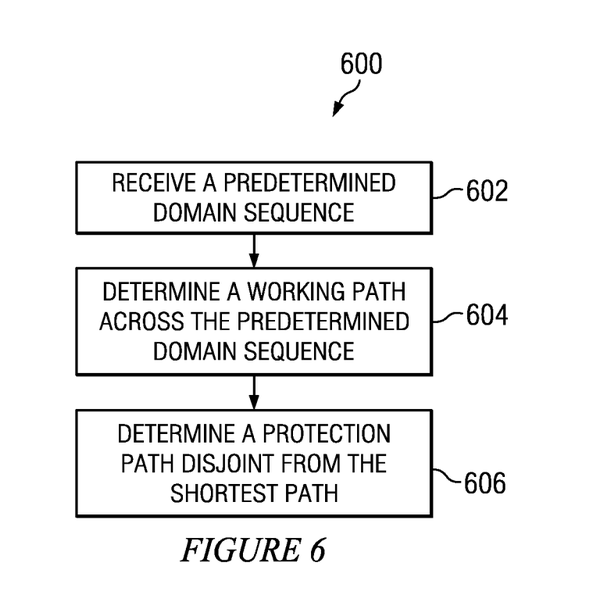
FIG. 6 illustrates an example method for implementing a multi-domain disjoint path or protection path computation, in accordance with certain embodiments of the present disclosure.

FIG. 6 illustrates an example method 600 for implementing a multi-domain disjoint path or protection path computation, in accordance with certain embodiments of the present disclosure. At step 602, a predetermined sequence of domains for routing data from a source node to a destination node may be received by the PCEs from network administrators. At step 604, a working path across the predetermined sequence of domains is determined. In some embodiments, the working path may be determined using, for example, the method shown in FIG. 4.

Next, at step 606, a protection path is determined. In some embodiments, PCEs 500 may determine which nodes are disjoint from nodes on the working path. For example, referring to FIG. 5, PCEs 500 may determine the ingress nodes not used in constructing the working path in the domain containing the destination node (e.g., ingress nodes 131 and 133 of domain 3). Next, any intervening domain(s) not containing the source node or destination node may determine one or more protection paths based on the available ingress nodes (e.g., domain 2). For example, in some embodiments, for each available ingress node, a PCE may execute an algorithm (e.g., two-step algorithm and/or Suurballe's algorithm) to determine if one or more protection path(s) are possible through the available ingress node(s). If one or more protection paths are determined, the intervening domains may pass the path options via a constructed VSPT to the domain containing the source node. The associated PCE to the domain containing the source node may determine which egress nodes may be disjoint from the working path. Using the available egress nodes from the domain containing the source node and the path options provided by the intervening domains, one or more protection paths are determined.

In other embodiments, PCEs 500 may determine which links are disjoint from links used in the working paths. Any links that may be used to form the working path may be removed from the network topology. Next, PCEs 500 may execute an algorithm (e.g., link disjoint two-step algorithm and/or Suurballe's link disjoint algorithm) to determine if one or more protection path(s) are possible. If one or more protection paths are determined, path options via one or more constructed VSPT may be provided to the domain containing the source node by at least the domain containing the destination node and any intervening domains. Using the available links from the domain containing the source node and the path options provided by the intervening domains, one or more protection paths are determined.

While the examples shown in FIGS. 5 and 6 illustrate using a forward path computation to determine working path 512 and a backward path computation to determine one or more protection paths 514, it is noted that the working path and/or protection path(s) may be determined by any combination of the forward and backward path computations described herein.

Although the present disclosure has been described in detail, it should be understood that various changes, substitutions, and alterations can be made hereto without departing from the spirit and the scope of the disclosure as defined by the appended claims.

What is claimed:

1. A method for determining a path calculation from a source node to a destination node over a multi-domain network, the method comprising:
   receiving a predetermined sequence of domains for communicating information from the source node to the destination node;
   using one or more processors of one or more path computation elements associated with the multi-domain network, determining a link type for each of a plurality of links in the predetermined sequence of domains;
   using the one or more processors, modifying the link type of one or more of the plurality of links such that the modified one or more of the plurality of links are unidirectional links towards a destination node, wherein modifying the link type of one or more of the plurality of links comprises at least one of: (a) modifying bidirectional links to unidirectional links towards the destination node, and (b) removing any unidirectional link towards the source node; and
   using the one or more processors, determining a path along the predetermined sequence of domains based on the modified one or more of the plurality of links.

2. The method according to claim 1, wherein determining a path between a source node and a destination node comprises constructing a virtual shortest path tree for each domain in the multi-domain network.

3. The method according to claim 2, wherein constructing a virtual shortest path tree comprises:
   determining a shortest path tree in source domain comprising the source node;
   forwarding the shortest path tree to an intervening domain, wherein the intervening domain constructs a new shortest path tree; and
   forwarding the new shortest path tree to a destination domain.

4. The method according to claim 3, wherein determining the path between the source node and the destination node comprises determining the path based on the new shortest path tree.

5. The method according to claim 1, wherein the path is a least costly path.

6. The method according to claim 1, wherein the path is from a source node of a first domain and a destination node of a second domain.

7. The method according to claim 1, wherein the predetermined sequence of domains is determined by a network operator or an inter-domain routing scheme.

8. A network system, comprising:
   a source domain comprising a source node;
   a destination domain communicatively coupled to the source domain, wherein the destination domain comprises a destination node;
   a first path computation element associated with the source domain;
   a second path computation element associated with the destination domain;
   wherein each of the first and second path computation element is configured to:
      receive a predetermined sequence of domains for communicating information from the source node to the destination node;
      determine a link type for each of a plurality of links in a respective domain;
      modify the link type of one or more of the plurality of links such that the one or more of the plurality of links are unidirectional links towards a destination node, wherein modifying the link type of one or more of the plurality of links comprises at least one of: (a) modifying bidirectional links to unidirectional links towards the destination node, and (b) removing any unidirectional link towards the source node; and
      determine a path along the predetermined sequence of domains based on the modified plurality of links.

9. The network system according to claim 8, wherein to determine a path between the source node and the destination node comprises constructing a virtual shortest path tree for the source domain and the destination domain.

10. The network system according to claim 9, wherein constructing a virtual shortest path tree comprises:
    determining a shortest path tree in the source domain;
    forwarding the shortest path tree to an intervening domain, wherein the intervening domain constructs a new shortest path tree; and
    forwarding the new shortest path tree to a destination domain.

11. The network system according to claim 10, wherein determining the path between the source node and the destination node comprises determining the path based on the new shortest path tree.

12. The network system according to claim 8, wherein the path is a least costly path.

13. A method for determining a path calculation from a source node to a destination node over a multi-domain network, the method comprising:
    using one or more processors of one or more path computation elements associated with the multi-domain network, modifying, in network topology information, bidirectional links to a unidirectional link from a source node to a destination node;
    using the one or more processors, removing, in network topology information, unidirectional links from the destination node to the source node; and
    using the one or more processors, determining a least costly path based on the network topology information with the modified and removed links between a source node and the destination node.

14. The method according to claim 13, further comprising receiving a predetermined sequence of domains.

15. The method according to claim 13, wherein determining the least costly path from the source node to the destination node comprises determining a path over the predetermined sequence of domains.

16. The method according to claim 13, wherein determining the least costly path between the source node and the destination node comprises constructing a virtual shortest path tree for each domain in the multi-domain network.

* * * * *